United States Patent [19]
Rymer

[11] 3,801,720
[45] Apr. 2, 1974

[54] DIGITAL DISPLAY GENERATORS

[75] Inventor: Harold Frank Rymer, Reading, England

[73] Assignee: Ferranti Limited, Hollinwood, Lancashire, England

[22] Filed: Oct. 29, 1971

[21] Appl. No.: 193,821

[52] U.S. Cl. ............................................. 35/10.4
[51] Int. Cl. ........................................... G09b 9/00
[58] Field of Search ..................................... 35/10.4

[56] References Cited
UNITED STATES PATENTS

| | | | |
|---|---|---|---|
| 3,446,903 | 5/1969 | Beizer................................. | 35/10.4 |
| 3,514,521 | 5/1970 | Burchard et al..................... | 35/10.4 |
| 3,571,479 | 3/1971 | Horattas et al. .................... | 35/10.4 |

Primary Examiner—T. H. Tubbesing
Attorney, Agent, or Firm—Edward J. Kondracki

[57] ABSTRACT

A digital display generator for producing a simulated coastline display for a radial-scan radar comprises two stores, a computer and a logic unit. One of the stores contains the cartesian co-ordinates of a plurality of spaced points along the simulated coastline, whilst the other store contains the individual elements forming the display between the spaced points. The computer operates to transform the co-ordinates of each spaced point from a fixed datum to a variable datum, whilst the logic unit determines, for each stroke of the radial scan, the point of intersection between the scan stroke and the coastline element nearest to the variable datum.

13 Claims, 6 Drawing Figures

DIGITAL DISPLAY GENERATORS

This invention relates to digital display generators, and particularly to such display generators for producing a simulated radar display.

Radar simulators are known for use in marine navigational training systems and the like, and in such systems it is convenient to generate and display both a simulated coastline and the positions of various ships and other objects. Since marine radar installations almost invariably use the radial-scan or "p.p.i. (plan position indicator)" type of display, such a simulator is required to function with the same type of scan.

The production or simulation of target echos is conveniently done by the use of digital techniques, but difficulty has been encountered in using the same techniques for generating a long coastline display. It has therefore been the practice to generate the coast line display by analogue means and to match this with the digitally-produced target echos. This has introduced the problems of accurate registration, especially if the simulator requires that several displays are provided, each representing a different ship in a different position. Similar problems arise if the display is used to represent other topographical contours including inland contours such as, for example, roads, railways and the outline of towns, with symbols being used to represent particular features as on a map.

It is an object of the invention to provide a digital display generator capable of producing a simulated topographical display for a radial-scan radar.

According to the present invention there is provided a digital display generator for producing a simulated topographical display for a radial-scan radar comprising first storage means operable to store the cartesian co-ordinates of each of a plurality of spaced points along a required simulated line relative to a fixed datum, second storage means operable to store a number of sets of elements each set being defined by one of said spaced points and determining the simulated line between said one point and the next, computer means operable to determine, for each stroke of the radial scan, the set or sets of elements in which at least one element intersects the scan stroke and to transform the coordinates of the spaced point defining the or each such set of elements relative to a variable datum, and logic means for determining, for each scan stroke, the range from the variable datum of the point of intersection of the stroke and the nearest one of said elements.

Also according to the invention each element is a line of unit length drawn in one of a fixed number of directions.

An embodiment of the invention will now be described with reference to the accompanying drawings, which illustrate the operation of a generator for producing a simulated coastline display. In the drawings.

Figure 1:
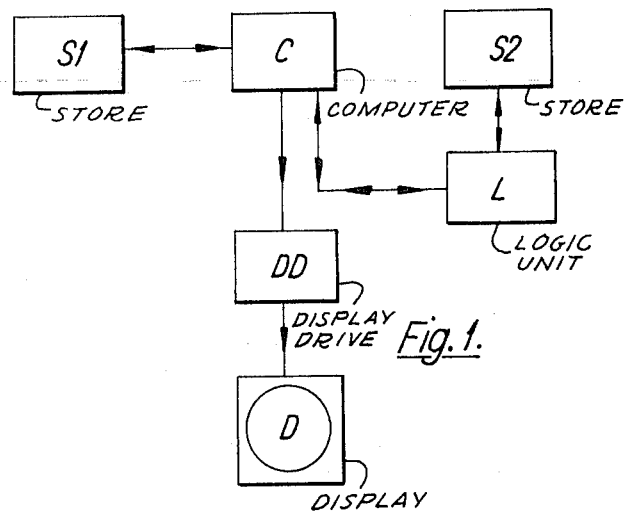
FIG. 1 is a block diagram of a complete display system.

Referring now to FIG. 1, the complete display system is centered around the computer C which has its own store S1. A second, autonomous, store S2 is also provided, access being provided between this store and the computer via a logic unit L. The computer controls a display drive unit DD and hence the actual p.p.i. display D.

Initially, a simulated coastline is devised, and divided up into "spans" of, say, three nautical miles each. The points at which adjacent spans meet are referred to as "joints," and the cartesian co-ordinates of each joint, relative to a fixed arbitrary datum, are stored in the computer storage S1. Up to 1000 of these joints may be stored, giving outline details of up to 3000 nautical miles of coastline. The spans between adjacent joints are themselves divided up into 192 elements of unit length, each of which represents 1/64th of a nautical mile. The autonomous store S2 stores the direction of each element relative to the previous element or joint by means of two bits of data, each span thus requiring 16 words, each of 24 bits, of storage capacity. In fact the second store S2 may conveniently be a 16,384 word store, the remaining 384 words being used to store details of the actual joints being processed at any one time. The computer store S1 will also contain details concerning the or each ship's actual position, antenna height and bearing etc.

The accuracy of the respresentation may be varied by changing the length of the element and making a corresponding change in the length of a span, and in the total length of coastline stored. Also, with a different word length store, the number of words per scan may be varied, but it is advisable to keep the number of words per scan as a power of two.

In order to produce a coastline on a display representing one particular ship, the computer C has to effect a co-ordinate transformation in respect of each joint representing a piece of coastline within radar range of the ship. This transformation is a simple mathematical operation, and need not be described further. Of greater importantce are the calculations which determine which part of the coastline shall be represented at each scan of the display, and also the determination of which of several possible elements shall be represented. The latter consideration arises when part of the simulated coastline is hidden by islands or headlands. These calculations are performed by the logic unit L, leaving the computer free to perform its other functions.

Figure 2:
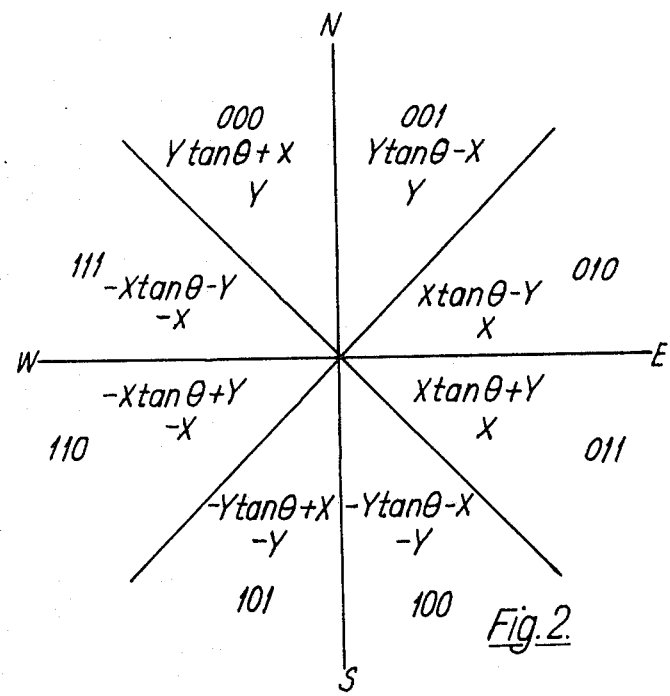
FIG. 2 illustrates the octant coding used.

In order to determine which part of the coastline shall be represented at any particular scan stroke of the display, the computer has to draw up a list of the joints having associated spans which could possibly cross the particular scan stroke. There may, of course, only be one such joint; on the other hand a complex coastline shape may produce several joints satisfying this condition. For each such joint the computer calculates $\tan\theta$ (where $\theta$ is the scan stroke bearing relative to the nearest cardinal direction), Y, and $Y\tan\theta - X$ (assuming the N-NE octant), where X and Y are the transformed cartesian co-ordinates of the joint. Because of the use of $\tan\theta$ it is also necessary to list the octant in which the stroke is located. Changes in octant will result in changes in sign of X, or Y or both. FIG. 2 illustrate the octants, together with the three-bit identifying code and the signs of X and Y.

Figure 3:
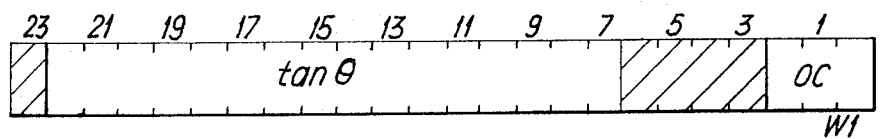
FIG. 3 illustrates the form of the computer output words.
Figure 3:
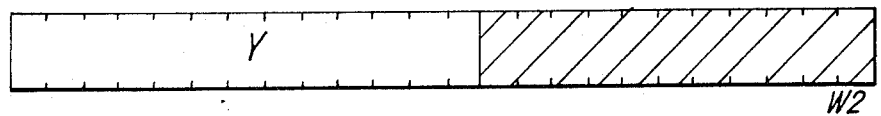
Figure 3:
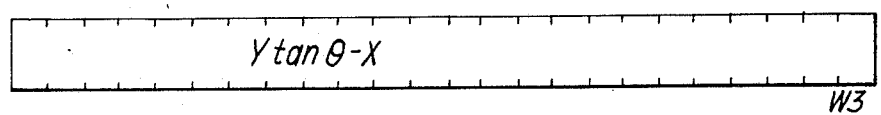
Figure 3:
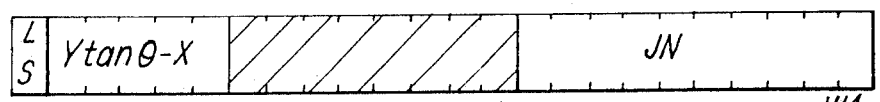

For each of the selected joints the computer passes four 24-bit words to the autonomous store S2 of the display generator. The contents of these words are shown in FIG. 3. Word W1 contains the three-bit octant code OC, together with a 16-bit number denoting $\tan\theta$, whilst word W2 carries a 13-bit number denoting Y. $Y\tan\theta$-X is given by a 29-bit number, which occupies all of word W3 and also five bits of word W4. Word W4 also carries the joint number JN and, where appropriate, a bit LS denoting that the span is the last available.

Figure 4:
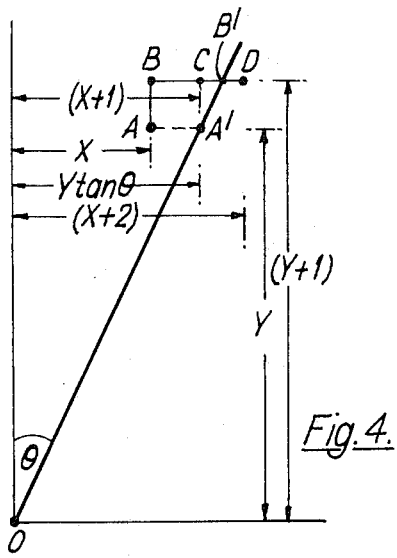
FIG. 4 illustrates the calculations necessary to generate a display.
Figure 5:
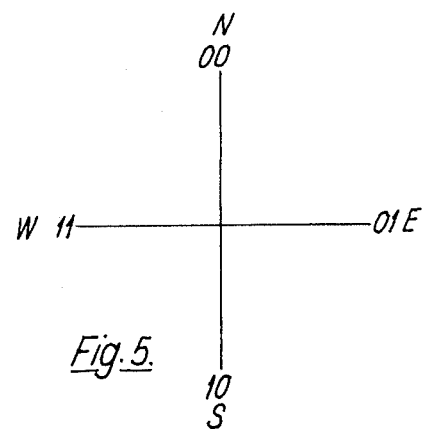
FIG. 5 illustrates the element coding used.

It is now necessary to describe the technique used to determine which element of a span intersects the scan stroke. FIG. 4 illustrates the principles involved. Each element of coastline is drawn or represented in either a North-South or an East-West direction, the actual direction being indicated by a two-bit code as shown in FIG. 5. Thus the coastline is not an exact representation of any real coastline, buta close approximation to it. The computer has already calculated the values of Y and $Y\tan\theta$-X for a joint having a span which might intersect the scan stroke, and the autonomous store S2 contains the two-bit code defining each element of the span. In FIG. 4 the ship's position is indicated at O and the joint is at A, having cartesian co-ordinates X and Y relative to the origin O. The actual scan stroke is indicated, at an angle $\theta$ to the North direction, and the cartesian co-ordinates of the corresponding point on the scan stroke, A', are $Y\tan\theta$ and Y. The displacement AA' is $Y\tan\theta$-X, a positive quantity. If the first element AB is in a North direction, and its end has co-ordinates X and (Y+1), then the corresponding point B' on the scan stroke is such that the displacement BB' is (Y+1)$\tan\theta$-X. This is also a positive quantity, and hence the element AB does not cross the scan stroke. Similarly, if the next element BC is in an East direction, the corresponding point on the scan stroke is still B'. The co-ordinates of C are (X+1) and (Y+1), and the distance CB' (Y+1)$\tan\theta$-(X+1). This is still positive. The next element CD is also in an East direction, and the co-ordinates of D are (X+2) and (Y+1). The corresponding point on the scan stroke is still B', and the displacement DB' is (Y+1)$\tan\theta$-(X+2). This quantity is negative, and this indicates that the element CD crosses the scan stroke.

The procedure detailed above is repeated for each element in each possible span, just in case more than one element crosses the scan stroke.

The logic which performs the calculations detailed above is shown in FIG. 5, together with the autonomous store S2. The various units are serviced by a 23-bit highway which is connected via an interface I to the computer C.

The input to the store S2 is by way of a register R1 communicating directly with the highway. Also applying an input to the store in a counter C1, which also applies input to a register R2 and to control logic CL1. A register R3 also receives inputs from the highway, and the two registers R1 and R3 apply inputs to control logic CL2. Two further registers R4 and R5 receive inputs from the highway and feed an adder/subtractor AS which applies signals to the highway on receipt of the appropriate add or subtract signals. Counters C2 and C3 are bidirectional counters, and are controlled by outputs from the control logic CL2, and apply inputs to control logic CL3. Counter C3 also feeds a register R6 which is controlled by an output of control logic CL3.

The output of the register R7 is also subtracted from the contents of counter C3 in a subtractor ST and the result passed to the control logic CL3. The remaining units are a counter C4 supplying control logic CL4.

The operation of the display generator logic is as follows:

As already stated, the computer determines the parameters of all joints concerned with a particular scan stroke and passes these to the store S2 and the associated logic. The octant code, bits 0 to 2 of word W1, are stored in register R3, whilst the 16 bits 7 to 22 defining $\tan\theta$ for the joint are stored in register R4. The value of Y, contained in bits 11 to 23 of word W2, is passed to counter C3, whilst the most significant 13 bits of $Y\tan\theta$-X, bits 11 to 23 of word W3, are passed to counter C2. The remainder of the bits defining $Y\tan\theta$-X, bits 0 to 10 of word W3 and bits 18 to 22 of word W4, are stored in register R5. The joint number, bits 0-9 of word W4, are passed to counter C1. Counter C1 also stores a further four bits which define one of the 16 words in store S2 covering the span associated with that particular joint.

The values of Y, $Y\tan\theta$-X, and joint number may be stored in store S2, via register R1, and then read from there into the registers and counters specified. This facility is useful if there is likely to be more than one joint and span considered per scan stroke. For this purpose an addrss is required for the locations of store S2 to contain these words. This is held in register R2, and passed to counter C1 before reading the words out.

The 14 bits in counter C1 are used to address the store S1 and hence transfer the first one of these 16 words to the register R1. Each element is defined by two bits of this word; hence the first two bits are passed to the control logic CL2. Similarly the tree bits defining the octant are applied to CL2 from the register R3. The control logic CL2 is a gating arrangement which derives stepping pulses $a$, $b$ and $c$ for counter C2, register R5 and counter C3 respectively, and which controls the direction of count of counters C2 andC3. It also controls the adder/subtractor AS. Hence the value of $Y\tan\theta$-X, that is the East displacement of the corresponding point on the scan stroke from the end of the element, or the value of Y, that is the North displacement of the end of the element from the origin O, is varied depending upon the direction of the element (for the N-NE octant). For other octants the variable quantities are as shown in FIG. 2. The adder/subtractor AS is used to update the contents of register R5 accordingly, the value of $\tan\theta$ in register R4 remaining constant for any particular scan stroke. In the case of, say, a horizontal (E-W) element, then register R5 is not updated, due to the absence of a clock pulse input to the register from the control logic CL2.

The sign of $Y\tan\theta$-X is denoted by bit 12 contained in counter C2, and similarly the sign of Y is denoted by bit 12 contained in counter C3. These sign bits are compared at the beginning and end of each element by control logic CL3, since any change in sign of $Y\tan\theta$-X will denote an element crossing the scan stroke. The control logic CL3 therefore contains one-bit delay and a gating arrangement to compare the values of $Y\tan\theta$-X at the beginning and end of each element. If $Y\tan\theta$-X does change, then the control logic derives a shift pulse $d$ which is applied to register R6, unless the value of Y becomes negative, indicating a 180° error in the value of $\theta$.

Register R6 is initially set to a value greater than the largest possible value of Y. Hence the output of the subtractor ST will be negative. Under this condition the output of the control logic CL3 causes the register R6 to be set to the actual value of Y from counter C3, denoting the value of Y for a crossing point. If a second crossing point between an element and the scan stroke is detected, and its value of Y is less than the value stored in register R6, then the output of subtractor ST is negative, causing R6 to be set to the new value of Y. If, however, the value of Y for the newcrossing point is greater than that already stored in R6, the output of subtractor ST will be positive. Under these circumstances control logic CL3 will not cause the contents of register R6 to be changed. This ensures that R6 holds the value of Y for the crossing point nearest to the simulated ships position. Consider now the actual example of FIG. 4. The joint in question, point A, is located in the N-NE octant. Hence, its octant code is 001 (see FIG. 2). This is stored in register R3. Similarly the co-ordinates of point A are X and Y, with respect to origin O. these are stored as Y tan $\theta$-X, denoting the horizontal distance of the point A from the scan stroke at A', and Y. These values are stored in counter C2 and register R5, and in counter C3 respectively.

The first element AB extends in a northerly direction from point A. Hence the two digits representing the element will be 00, and these are clocked from register R1 into control logic CL2 together with the octant code 001 from register R3. The control logic in this case produces the + control signal and pulses $b$ and $c$. The + control signal applied to the adder/subtractor AS causes the value of tan $\theta$ in register R4 to be added to the least significant part of Ytan$\theta$-X from register R5. The resultant sum is (Y+1)tan$\theta$-X, denoting the distance BB', and this is put into register R5 via the highway, owing to the presence of the $b$ pulse. If this addition has resulted in a "carry" from the adder/subtractor AS, the control logic CL2 would have produced the $a$ pulse, causing the count in counter C2 to be increased by one. The count in counter C3 is also increased by one by the presence of the $c$ pulse, giving a new value of (Y+1).

As already stated, the value stored in register R6 is greater than any actual value of Y. This is subtracted from the new value of (Y+1) from counter C3 by subtractor ST. The sign of this difference is negative. A signal indicating this is passed to control logic CL3 together with the sign bits from counters C2 and C3. The absence of a $d$ output from the control logic indicates the absence of an intersection between the element AB and the scan stroke.

The second element is BC, denoted by the digits 01. Control logic CL2 now produces the — control signal and pulse $a$. This causes the count in counter C2 to be reduced by one, from (Y+1)tan$\theta$-X to (Y+1)tan$\theta$-(X+1). The sign bit of this is unchanged, and hence there is no $d$ output from control logic CL3.

Thethird element, CD, is denoted by the digits 01, as was element BC. Hence again, control logic CL2 produces the — control signal and the $a$ pulse, and the count in counter C2 is again reduced by one. The count now becomes (Y+1)tan$\theta$-(X+2), this denoting the distance CB'. The sign of the term stored in counter C2 now changes, and this is detected by control logic CL3. The sign of (Y+1) in counter C3 and the sign of the output from subtractor ST remains unchanged. Control logic CL3 now produces the $d$ output, and this allows the contents of register R6 to be changed from the initial value to the latest value of Y+1.

Each element of the span is treated in the same way, register R1 being stepped on two bits for each element. At the end of one word, the next of the 16 words is similarly treated, and so on up to the end of the span. If an intersection occurs when a smaller value than Y+1 is stored in counter C3 then the value in register R6 will be reduced. If, however, further intersections occur with larger values than Y+1, then register R6 is not updated. Hence at the end of the operation, register R6 contains either the Y value for the nearest intersection or, if no intersection occurred, the initial large value set into the register. Control logic CL1 gives an output LW when the last word from store S2 denoting elements associated with joint A is reached and is entered into counter C1. Similarly control logic CL4 controlled by counter C4 derives an output LE when the last element has been processed. These two signals together indicate that the entire span has been considered and the next one listed by the computer as having possible intersection with the same scan stroke is examined. The values of the octant code and tan $\theta$ will be the same, only the values of Y and Ytan$\theta$-X being different.

The last span listed by the computer is denoted by bit 23 of word 4, this is detected by the last span detector LS which causes the value in register R6 to be returned to the computer C via interface I. The computer first determines whether or not this represents an intersection. If so, since the particular value of $\theta$ is known, and the register gives the value of Y, the computer is able to calculate the length OB' to the intersection along the scan stroke. This is passed to the display drive DD which produces a spot on the display tube D at the required distance from the "ship's position" origin O.

If several joints are processed for a particular value of $\theta$, word W1 need only be handled once, since the value of tan$\theta$ and the octant code will not change.

In this case word W1 will be placed in the specified register, and words W2 to W4 for each joint will be placed in store S2. Words W2 to W4 for a joint are subsequently read out to the registers and counters specified and the span is processed. This is repeated for each span.

The above process is repeated for each increment of $\theta$ as the scan stroke rotates. The values of Y and $\theta$ may be combined with other values denoting other ships, etc., inserted by other means. Since the display generator uses digital techniques, registration is accurately obtained.

The process described for finding ranges of simultaed coastlines may also be used for finding ranges of one or more inland contours. For this purpose some of the 1000 joints and spans may be considered as representing parts of the contours rather than parts of the coast. This will reduce the total length of coastline stored, unless a larger store S3 is used, and more locations are used in the computer store S1. If coast and contour are both represented the element size may be different for each provided that the number of elements per span remains constant.

The coastline generator is preferably arranged to work in advance of the scan stroke, so that the computer contains the parameters of range and bearing for several strokes in advance of the actual scan.

The use of four 24-bit words to control the operation of the display generator is only one way in which the invention may be put into effect. A different number of words of different length could be used. The coding of the octants and quadrants shown in FIGS. 2 and 5 may also be varied, and elements may be drawn in more than four directions.

Figure 6:
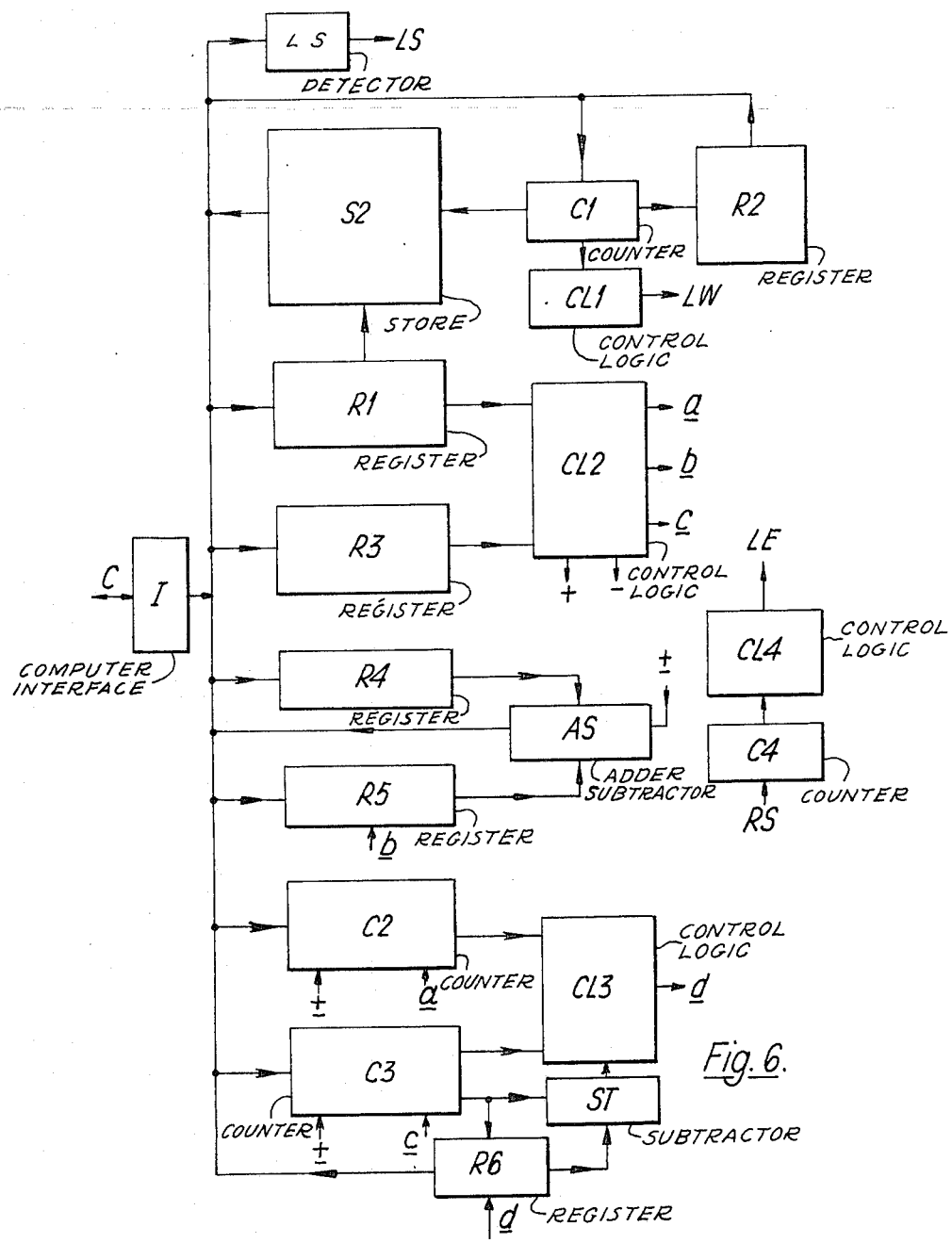
FIG. 6 is a block diagram of the logic unit and second store.

The logic making up FIG. 6 has not been specified in detail since the various functions may be carried out in various ways. The block diagram itself is only an example of the necessary features of the logic. The display generator described above for generating coastline display may, as hereinbefore noted also be used equally well for producing other topographical details or inland contours. The lines produced, may for example, represent parts of inland contours such as for example roads, railsways or the outline of towns. These may be combined with conventional symbols as on maps. The operation of the display generator would be exactly as described above, though the number of spans having possible intersections with a scan stroke and listed by the computer could be much greater.

What we claim is:

1. A digital display generator for producing simulated coastline display for a radial-scan radar comprising first storage means operable to store signals representing the cartesian co-ordinates of each of a plurality of spaced points along a required simultaed coastline relative to a fixed datum, second storage means operable to store signals representing a number of sets of elements each set being defined by one of said spaced points and determining the simulated coastline between said one point and the next, computer means operable to determine, for each stroke of the radial scan, the set or sets of elements in which at least one element may intersect the scan stroke and to transform the co-ordinates of the spaced point defining the or each such set of elements relative to a variable datum, and logic means operably interconnected to said computer means and said second storage means for determining, for each scan stroke, the presence of such an intersection and the range from the variable datum of the point of intersection of the stroke and the nearest one of said intersecting elements.

2. A digital display generator as claimed in claim 1 in which the logic means includes means for representing each element as a straight line of unit length in one of a fixed number of directions from a point.

3. A digital display generator as claimed in claim 1 in which the logic means includes means for representing each element as a straight line of unit length in one or the other sense in either of two perpendicular co-ordinate directions from a point to give four directions from said point.

4. A digital display generator as claimed in claim 3 in which the logic means includes means for representing each element as a straight line in either of two perpendicular co-ordinate directions from a point thereby giving four mutually perpendicular directions from said point, said four mutually perpendicular directions represent the four cardinal compass directions.

5. A digital display generator as claimed in claim 1 in which the logic means includes means operable to determine, for each scan stroke, which element or elements in the or each of said sets of elements intersects the scan stroke.

6. A digital display generator as claimed in claim 5 in which the logic means includes means for determining for each element in each of said sets of elements, the cartesian co-ordinates of the end of each element and of the point of intersection between the scan stroke and the element or a projection thereof in a fixed predetermined co-ordinate direction, and the sense of the direction from the end of the element to said point of intersection, a change in the sense of this direction relative to that for the previous element denoting an intersection between the element and the scan stroke.

7. A digital display generator as claimed in claim 6 in which the logic means includes means for determining the range from the variable datum of each one of said points of intersection between an element and the scan stroke and means for passing to the computer the parameters of the element containing the point of intersection nearest to said datum.

8. A digital display generator for producing a simulated topographical displsy for a radial-scan radar comprising first storage means operable to store signals representing the cartesian co-ordinates of each of a plurality of spaced points along a required simulated topogrphicial contour relative to a fixed datum, second storage means operable to store signals representing a number of sets of elemens each set being defined by one of said spaced points and determining the simulated topographical contour line between said one point and the next, computer means, operable means for interconnecting said computer means and said first storage means, said computer means being operable to determine, for each stroke of the radial scan, the set or sets of elements in which at least one element may intersect the scan stroke and to transform the co-ordinates of the spaced point defining the or each such set of elements relative to a variable datum, the logic means interconnected to said computer means and said second storage means for determining, for each scan stroke, the presence of such an intersection and the range from the variable datum of the point of intersection of the stroke, and the nearest one of said intersecting elements.

9. A digital display generator as claimed in claim 8 in which the logic means includes means for representing each element as a straight line of unit length drawn in one of a fixed number of directions from a point.

10. A digital display generator as claimed in claim 9 in which the logic means includes means for representing each element as a straight line of unit length in one or the other sense in either of two perpendicular co-ordinate directions to give four mutually perpendicular directions from said point, said four mutually perpendicular directions representing the four cardinal compass directions.

11. A digital display generator as claimed in claim 8 in which the logic means includes means operable to determine, for each scan stroke, which element or elements in the or each of said sets of elements intersects the scan stroke.

12. A digital display generator as claimed in claim 11 in which the logic means includes means for determining for each element in each of said sets of elements, the cartesian co-ordinates of the end of each element and of the point of intersection between the scan stroke and the element or a projection thereof in a fixed predetermined co-ordinate direction, and the sense of the direction from the end of the element to said point of intersection, a change in the sense of this direction relative to that for the previous element denoting an intersection between the element and the scan stroke.

13. A digital display generator as claimed in claim 12 in which the logic means includes means for determining the range from the variable datum of each one of said points of intersection between an element and the scan stroke and means for translating to the computer signals representing the parameters of the element containing the point of intersection nearest to said datum.

* * * * *